United States Patent
Schiltz (10) Patent No.: US 10,287,943 B1
(45) Date of Patent: May 14, 2019

(54) SYSTEM COMPRISING DUEL-FUEL AND AFTER TREATMENT FOR HEAVY-HEAVY DUTY DIESEL (HHDD) ENGINES

(71) Applicant: M&R Development, Algona, IA (US)

(72) Inventor: Mike Schiltz, Algona, IA (US)

(73) Assignee: Clean Power Technologies, LLC, Algona, IA (US)

( * ) Notice: Subject to any disclaimer, the term of this patent is extended or adjusted under 35 U.S.C. 154(b) by 205 days.

(21) Appl. No.: 15/386,924

(22) Filed: Dec. 21, 2016

Related U.S. Application Data (60) Provisional application No. 62/387,352, filed on Dec. 23, 2015.

(51) Int. Cl.
*F01N 3/10* (2006.01)
*F01N 3/20* (2006.01)
(Continued)

(52) U.S. Cl.
CPC .......... *F01N 3/204* (2013.01); *F01N 3/0275* (2013.01); *F01N 3/103* (2013.01); *F01N 3/2006* (2013.01);
(Continued)

(58) Field of Classification Search
CPC ...... F01N 3/024; F01N 3/2066; F01N 11/002; F01N 11/007; F01N 13/008; F02B 43/04;
(Continued)

(56) References Cited

U.S. PATENT DOCUMENTS

2004/0111210 A1* 6/2004 Davis .................... F02D 19/027
  701/103
2010/0229538 A1* 9/2010 Bloms ................... F01N 3/0256
  60/295

(Continued)

FOREIGN PATENT DOCUMENTS

| CN | 104747285 A | * | 7/2015 | |
|---|---|---|---|---|
| CN | 204476559 U | * | 7/2015 | |
| FR | 2870294 A1 | * | 11/2005 | ......... F02D 19/0631 |

OTHER PUBLICATIONS

CN 204476559, Machine Translation, Translated on Sep. 11, 2018.*

*Primary Examiner* — Patrick D Maines
(74) *Attorney, Agent, or Firm* — Camille L. Urban; BrownWinick Law Firm (57) ABSTRACT

The present invention provides up-fit after treatment technology for bringing Heavy-Heavy Duty Diesel (HHDD) engine powered vehicles into compliance with the Title 13 CCR, Part 2025 mandate (meeting 2010 criteria emission standards). It also includes a Dual Fuel system, Exhaust Thermal Management System further reducing: NOx constituents, consumption of diesel fuel, particulate matter and CO2 emissions. The invention further comprises multiple sensors that provide data to electronic control module(s). The APGV6000 enables rapid after-treatment thermal activation, compares "real-time" sensor data with target data, and adjusts the after treatment system and/or dual fuel system and/or Exhaust Thermal Management system to produce exhaust emissions well below 2010 exhaust emission standards. For 2010 and newer HHDD engine applications, the V6000 comprises the Dual Fuel and exhaust thermal management system to affect rapid after-treatment activation, reduced NOx emissions well below, 2010 (current) standards, reduce diesel fuel usage and reduce CO2 emission.

2 Claims, 10 Drawing Sheets

(51) Int. Cl.
*F02B 43/10* (2006.01)
*F02D 19/06* (2006.01)
*F02D 19/08* (2006.01)
*F02B 43/04* (2006.01)
*F01N 11/00* (2006.01)
*F02M 21/02* (2006.01)
*F01N 13/00* (2010.01)
*F01N 3/027* (2006.01)

(52) U.S. Cl.
CPC .......... *F01N 3/2066* (2013.01); *F01N 11/002* (2013.01); *F01N 11/007* (2013.01); *F01N 13/008* (2013.01); *F02B 43/04* (2013.01); *F02B 43/10* (2013.01); *F02D 19/0602* (2013.01); *F02D 19/0647* (2013.01); *F02D 19/081* (2013.01); *F02M 21/0215* (2013.01); *F01N 2550/02* (2013.01); *F02B 2043/103* (2013.01)

(58) Field of Classification Search
CPC .. F02B 43/10; F02D 41/0025; F02D 41/0035; F02D 2200/08
See application file for complete search history.

(56) References Cited

U.S. PATENT DOCUMENTS

| | | | |
|---|---|---|---|
| 2011/0016848 A1* | 1/2011 | Brooks | F01N 3/0231 60/274 |
| 2012/0310509 A1* | 12/2012 | Pardo | F02D 19/061 701/104 |
| 2013/0019588 A1* | 1/2013 | Richardson | F01N 3/106 60/274 |
| 2013/0213010 A1* | 8/2013 | Zhang | F01N 3/2013 60/274 |

* cited by examiner

Dual Fuel System 120

+

Exhaust Thermal Management System

+

After Treatment System 220

+

HHDD Engine 110

=

APGV6000

SYSTEM COMPRISING DUEL-FUEL AND AFTER TREATMENT FOR HEAVY-HEAVY DUTY DIESEL (HHDD) ENGINES

CROSS REFERENCE TO PRIOR APPLICATIONS

This application claims benefit from United States Patent and Trademark Office Provisional Application No. 62/387,352 which was filed on Dec. 23, 2015.

FIELD OF THE INVENTION

Over the past four decades, various U.S. EPA and California Air Resource Board (CARE) regulations, mandates and laws have been enacted with the goal of reducing smog forming, health challenging vehicular exhaust emissions, and reduce the use of fossil fuels. Many of these regulations address exhaust emissions from over-the-road trucks powered by heavy duty diesel engines.

The present invention provides an emissions management system (tradename APG V6000 ("V6000")) comprising a dual fuel system, appropriate after treatment technology and exhaust thermal management system.

The APG V6000 pre-2010 configuration provides means by which pre-2010 Heavy Heavy Duty Diesel (HHDD) engine powered vehicles may be brought into compliance with the Title 13 CCR, Section 2025 mandate (which requires all pre-2010 HHDD engines to meet 2010 exhaust emission regulation standards by calendar year 2021 thru 2023).

The APG V6000 "pre-2010" configuration (for 2007-2009 M.Y.'s) utilizes a select catalytic reduction system, Dual Fuel system and exhaust thermal management system. By combining a Duel Fuel (Natural Gas/Diesel) system with appropriate after-treatment technologies, and exhaust thermal management system, regulated criteria exhaust emissions of gaseous Nitrogen Dioxide (NO2), Nitric Oxide (NO) and Nitrous Oxide (N2O), grouped and commonly referred to as NOx, Non-Methane Hydrocarbons (NMHC), Carbon Monoxide (CO) and Particulate Matter (P.M.), are reduced below 2010 standards., consumption of diesel fuel is reduced, and CO2 exhaust emissions are reduced.

The APG V6000 "2010 and newer" configuration utilizes a Dual Fuel system and exhaust thermal management system only. As all HHDDE OEM systems have after-treatment systems consisting of DOC/DPF and SCR systems, which achieve 2010 HD exhaust emission standards, no after-treatment updates are needed therefore the APG V6000 "2010 and newer" configuration only requires the Duel Fuel (Natural Gas/Diesel) system, and exhaust thermal management system, to achieve reduced regulated criteria exhaust emission level well below 2010 standards as well as reduced diesel fuel consumption and CO2 emission reduction.

The exhaust thermal management system uses NG fuel, NG injector(s), CH4 sensors, exhaust temperature sensors, appropriate electronic system control and a pre-DOC and/or pre-SCR igniter(s) to effect very rapid after-treatment thermal activation (light-off) for greater carbon based emissions oxidation and greater NOx reduction.

DESCRIPTION OF THE RELATED ART

Heavy-Heavy Duty Diesel (HHDD) engine powered vehicles, including current as well as pre-2010 HHDD engine powered vehicles represent a significant portion of diesel-powered vehicles on the roads. Like earlier versions of the diesel engine, these engines are reliable, durable, and perform the important function of powering large cargo-transport vehicles. They also contribute to measurable regulated criteria pollutants of Particular Matter (P.M.), Nitrogen Oxide (NOx), Carbon Monoxide (CO) and Non-Methane Hydro-Carbons (NMHC).

Particulate Matter (P.M.) in diesel exhaust (e.g., soot which may be visible as dark-colored exhaust containing airborne particles resulting from operation of diesel engines) presents health concerns. P.M. is primarily carbon particles and comes in various sizes (25 microns or greater, 2 microns or smaller), the smaller particles being particularly hazardous as they can travel deeper into the lungs. Like gaseous emission measurements, P.M. emission measurements involves drawing an exhaust gas sample from the vehicle's exhaust system, diluting it with air then, unlike gaseous emission measurements, filtering through sampling filters. The mass of particulate emissions is determined based on the weight of P.M. collected on the sampling filter.

In an attempt to arrest and reduce the level of HHDD engine exhaust emissions, the U.S. EPA and the California Air Resource Board (CARE) enacted increasingly stringent criteria pollution emission regulation standards, which the Original Equipment Manufacturers (OEM's) met by first, enacting base engine emission controls (pre-2007) and subsequently, exhaust system after-treatment (2007 and newer). In 2010 the U.S. EPA and CARB criteria pollutant emission regulation standards reached their current and most stringent levels which required OEM's to supplement their existing Diesel Oxidation Catalyst (DOC) and Diesel Particulate Filter (DPF) after-treatment systems with Selected Catalytic Reduction (SCR) NOx reduction after-treatment technology.

Early (circa 2000) base engine emission control features included: high pressure Direct Injection (DI), Turbo-Charging (TC), Charge-Air-Cooling (CAC), Electronic Control Modules (ECM's), and Closed Crankcase Ventilation (CCV). Due to changes in the HHDD engine regulated emission standards, starting in October 2002 domestic OEM's incorporated Exhaust Gas Recirculation (EGR) to further reduce NOx emissions to attain compliance with the pulled ahead, 2004, upgraded HHDD engine exhaust emission standards.

In 2007, further changes in HHDD engine exhaust emission standards were enacted and after-treatment systems were incorporated into HHDD engine systems. In these early after-treatment technologies, carbon based gaseous pollutants, (Carbon-Monoxide (CO) and Non-Methane Hydro-Carbons (NMHC)) are oxidized by the Diesel Oxidation Catalyst (DOC) to form water vapor and Carbon Dioxide (CO2). The carbon based Particulate Matter (P.M) (produced when direct injected diesel fuel is combusted before fully vaporized), is trapped by the Diesel Particulate Filter (DPF), which is regularly regenerated by injecting an amount of diesel fuel via a "DOC/DPF doser" (injector) at the inlet of the DOC/DPF, raising the exhaust gas temp at the exit of the DOC above 550 C to burn up the trapped P.M. within the DPF into CO2.

In 2010, more stringent Nitrous Oxide (NOx) exhaust emission standards were enacted and the addition of the Selective Catalytic Reduction (SCR) after-treatment was introduced by most OEM's. In an SCR after-treatment system, a wash coat comprising copper-zeolite and/or Iron-zeolite or vanadium oxide is employed to hold the urea and NOx constituents for mixing and subsequent reduction of NO, NO2, N2O. NOx is "reduced" by the dosing of the exhaust stream with a Urea/water based liquid where Hydrogen from the urea bonds to the oxygen within in the NOx, reducing the NOx to H2O and N2. DPF regeneration (of P.M.) requires oxygen and exhaust-gas temperatures of at least 550 C which is achieved by dosing the post turbo exhaust stream with diesel fuel just before the Diesel Oxidation Catalyst (DOC) which then generates enough heat to raise the temperature of exhaust gases within the DPF to the required level. HHDD engine application vehicle OEM's utilize on-board after-treatment sensors and after-treatment electronic control modules (ECMs) to monitor after-treatment temperatures, pressures, and NOx concentration levels. The OEM's also use sensors and control modules to properly control said temperatures, DPF regeneration (diesel fuel dosing) schedules and SCR urea dosing rates for the purpose of continuously maintaining exhaust emissions to meet (or improve over) regulated criteria exhaust emission levels.

The OEM engine control computer (engine control module: ECM) and the after-treatment control module(s) communicate through the engine/vehicle Communication Area Network (CAN) in order to maintain the precise control required to meet the regulated emission standards.

SUMMARY OF THE PRIOR ART

Methods of partial substitution of Natural Gas (NG) for diesel fuel, (defined as "Mixed Fuel", "Bi-Fuel", or "Dual Fuel") in HHDD engine applications, have various configurations and typically have Electronic Control Module(s) (ECM's), to monitor many engine parameters as well as control the NG fuel introduction. Some prior art mixed fuel systems have a very high percentage of natural gas utilization and employ small amounts of diesel fuel only as a liquid pilot ignition fuel. For example, measured quantity of natural gas is directly injected into the engine's combustion chambers utilizing "high pressure" NG injectors and is compressed to the same levels as the base diesel engine. Because the natural gas (NG) mixture does not spontaneously ignite under high compression, the system uses a small secondary direct injection of diesel fuel to ignite the main charge of NG and air. Because these configurations utilize "high-pressure" direct NG and diesel fuel injector systems, they are very costly and have had a history of poor reliability.

In another version of a mixed fuel system, a gaseous fuel such as compressed natural gas (CNG) is passed through an induction mixer where it is mixed with intake air and passed to the turbocharger compressor, through the Charge Air Cooler (CAC), and to the engine. The precise mix of intake air and NG fuel is key to maximizing the substitution of the gaseous NG fuel for the liquid diesel fuel. For prior art mixed fuel systems, the ratio of fuels in the mix is the result of employing data from a number of sensors (e.g. Lean Exhaust Gas Oxygen sensor (L-EGO), fuel flow calculations based on mass-air flow calculations, intake manifold temperature and intake manifold pressure) and controllers which monitor, calculate and control the rate of NG fuel and the injection/fumigation timing. Many prior art mixed fuel systems control the substitute natural gas (NG) fuel flow via on-off solenoid(s) and meter it to an induction mixer using a manually set, mechanically adjusted "power" or "trim" valve. This valve is set initially by the installation technician. If different max NG flow rates are desired, the valve must be manually reset. These configurations have modest cost but lack the NG metering precision needed to attain compliance with U.S. EPA and CARB regulated exhaust emission standards.

Other prior art mixed fuel systems include multi-stage NG fuel injector control. These systems change the rate of substitute fuel flow through electrical control module (ECM) programming and utilize "moderate-pressure" fuel injectors to inject NG into the pressurized induction air flow-stream downstream of the Charge Air Cooler (CAC). These systems can be expensive and rely fully on digital information from their mixed-fuel ECM. If the engine system was to suffer an unexpected event, (i.e., accident resulting in a loss of post turbo induction system integrity), the NG injected system may keep injecting NG fuel creating a potentially hazardous situation. Further, their operation can reduce the engine's durability due to the change in combustion dynamics and associated higher temperatures if these systems are allowed to "over-fuel".

In some prior art mixed fuel fumigated systems, the natural gas (NG)/induction air mixture is physically created by a mixer into which intake air is drawn and natural gas (which may be at sub-atmospheric pressure) enters. The traditional mixer is purchased or fabricated at a cost of around $300 US. This mixer typically comprises a cylinder into which a diffuser is mounted. The diffuser acts as a restrictor, creating a vacuum and mixing effect as intake air is drawn in parallel to the axis of the cylinder and gaseous fuel is drawn in perpendicular to the intake airflow direction. The substitute fuel (NG or "other"), is metered to the traditional mixer as described above.

SUMMARY OF THE INVENTION

The present invention comprises an APG V6000 system in several embodiments for use with pre-2010 engines as well as 2010 and newer engines. The system provides: reduction of Nitrogen Oxide (NOx) emissions, oxidation of Non Methane Hydro Carbons (NMHC) and Carbon Monoxide (CO), trapping and management of Particulate Matter (PM) emissions, all to 2010 regulated levels (or lower) targeted readings, through the up-fit of appropriate after-treatment technologies. The APG V6000 also reduces diesel fuel consumption with substitution rates of between about 40% and about 65%, with typical over-the-road highway substitution rates of about 50% to about 55% and reduces CO2 exhaust emissions up to about 11%. Whilst the aforementioned and described appropriate after-treatment technologies will reduce the NOx, NMHC, CO and P.M. to 2010 regulated standard levels, the APG V6000 technology of the present invention, in addition to the aforementioned and described appropriate after-treatment includes the APG Dual Fuel system (which reduces diesel fuel consumption about 50%-55%) and an Exhaust Thermal Management System (ETMS), which will further reduce NOx levels far below the 2010 regulated standards. Specifically, engine applications that comprise this after-treatment technology (DOC, DPF, SCR) and Dual Fuel system technology of the present invention may expect NOx emission values ranging between about 0.090 to about 0.151 g/bhp-h (reference HD NOx Standard=0.20 g/bhp-h), resulting in a NOx emission reduction of between about 39% and about 47% below the diesel fuel only (baseline) operation and up to 55% below the NOx emission standard. Further, CO2 reduction may be up to about 11% as compared to a diesel fuel only operation. By adding the Exhaust Thermal Management System (ETMS) technology of the present invention to 2010 and newer engines as well as to pre-2010 engines, expected NOx emission values will be between about 0.046 to about 0.084 g/bhp-h resulting in a NOx emission reduction of between about 55% and about 75% below the diesel fuel only (baseline) operation and up to 77% below the NOx emission standard.

The APG V6000 comprises a combined suitable after-treatment system comprising DOC, DPF, and SCR; Exhaust Thermal Management System (ETMS); and Dual Fuel up-fit system which are controlled relative to each other through the use of sensors and controller(s) having multiple channels e.g. multiple channel electronic control module ECM. The Exhaust Thermal Management System (ETMS) utilizes pre and post DOC CH4 sensors, Pre-DOC and/or Pre-SCR NG dosing fuel line and injector(s) and igniters which may comprise a sparking or "glow-plug" electrode style igniter, along with exhaust thermal controller ECM and software by which exhaust gas temps are monitored (utilizing exhaust temperature sensors, Therocouples (TC) or Resistance Temperature Device (RTD)) and can be rapidly increased during engine system cold start and/or for desired CH4 oxidation. Specifically, the on-board NG fuel and exhaust stream positioned injectors and igniters can be used for a pre-heat function to achieve very rapid DOC and SCR lite-off (activation). This reduces "cold start" gaseous carbon based emissions in the DOC and reduces "cold start" gaseous NOx emissions in SCR. It is also possible to utilize APG Dual Fuel-controlled momentary NG enrichment control strategy and pre-DOC and Pre-SCR igniter(s) to provide the same rapid light-off function.

One or more of the multiple channel ECM's (along with the appropriate software) control the Duel Fuel system, one or more after-treatment and exhaust thermal management system ECM's, along with the appropriate software, and read the results of the after treatment system sensors, allowing said controller(s) to adjust the parameters of each process as needed to more precisely manage exhaust temperatures, emissions, and NG substitution. The present invention achieves its objectives through the managed, co-existing processes of exhaust temperature management, exhaust emission reduction and diesel fuel consumption reduction control in a pre-2010 HHDD engine equipped vehicle to meet (or provide significantly lesser exhaust emissions than required by) the CARB Title 13, CCR, Section 2025 mandate.

In a 2010 and newer HHDD engine application, the HHDD comes equipped from the factory with DOC/DPF and SCR after-treatment systems. The upfit of the present invention comprises the Exhaust Thermal Management System (ETMS) and Dual Fuel system. The ETMS and Dual Fuel systems provides the newer HHDD engine system with means to reduce the criteria pollutants well below current standards as well as means to achieve rapid heating at "key on" thereby nearly eliminating most of the time lapse in which DOC and SCR become activated and functioning. Most SCR systems require 250-350 seconds to achieve 200 C activation temperatures. The addition of the ETMS of the present invention reduces the time to achieve activation temperature to about 10 seconds or even less. A single high function Electronic Control Module (ECM) or multiple ECM's communicating by way of CAN may be utilized.

DETAILED DESCRIPTION

In the embodiment employed with 2010 and newer HHDD engines, the APG V6000 (or V6000) 1 (FIG. 2) of the present invention in its simplest embodiment is combined with a 2010 or newer Heavy-Heavy Duty Diesel (HHDD) engine 110 and comprises and APG Dual Fuel system 120 substituting an amount of natural gas (NG) 25 for diesel fuel 130 (see FIGS. 2, 2a and 2b.) and an exhaust thermal management system 500 comprising means to rapidly heat the factory-provided DOC/DPF and SCR systems.

Figure 2:
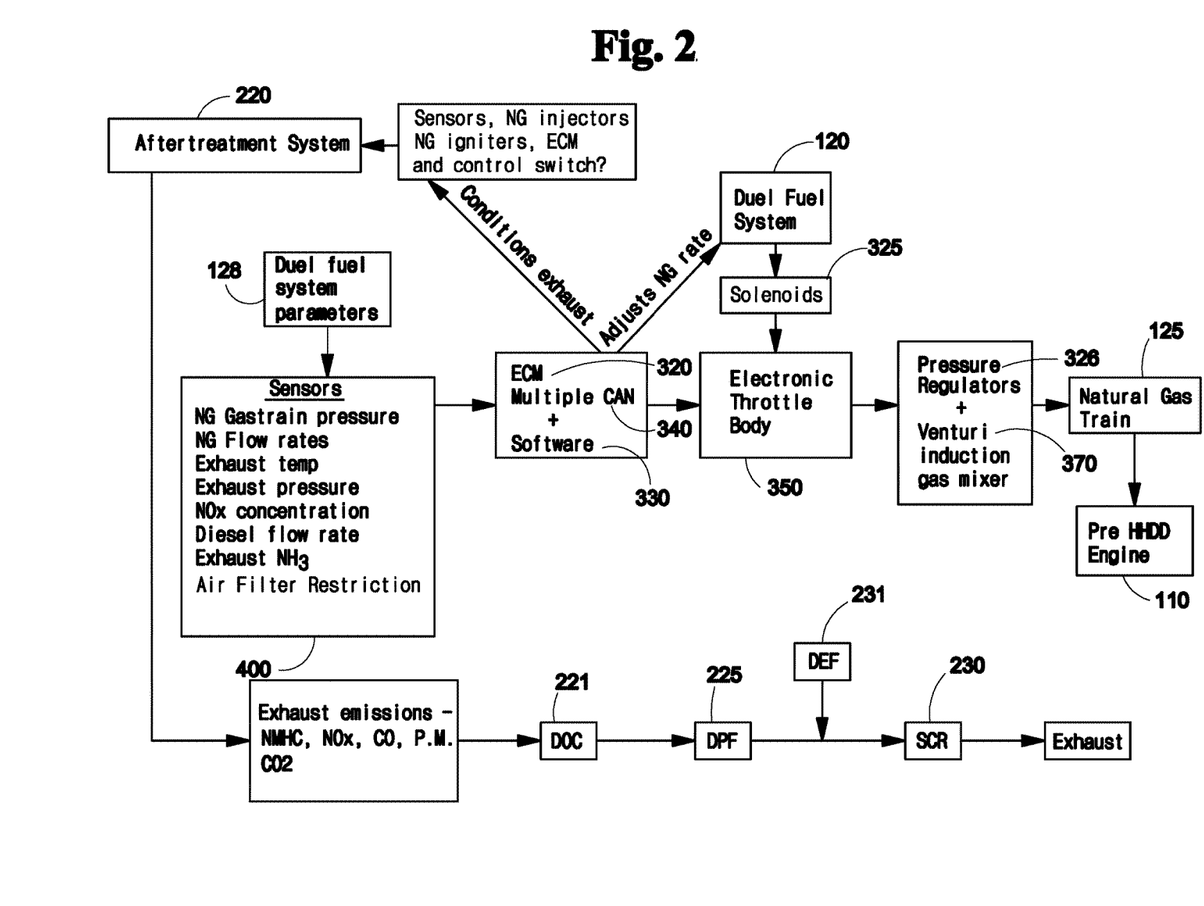
FIG. 2 provides a flow diagram illustrating the ECM and software control of the dual fuel system and the after treatment system.
Figure 2A:
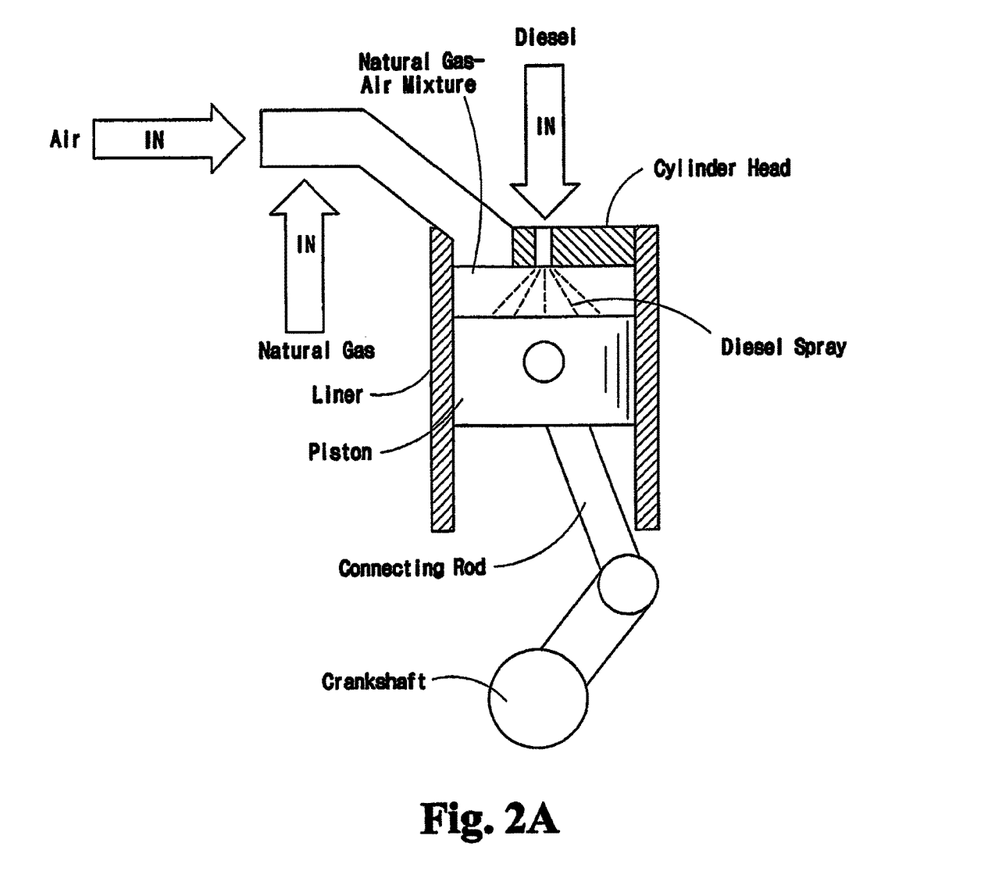
FIG. 2a comprises a drawing illustrating the general operation of a dual fuel assembly.
Figure 2B:
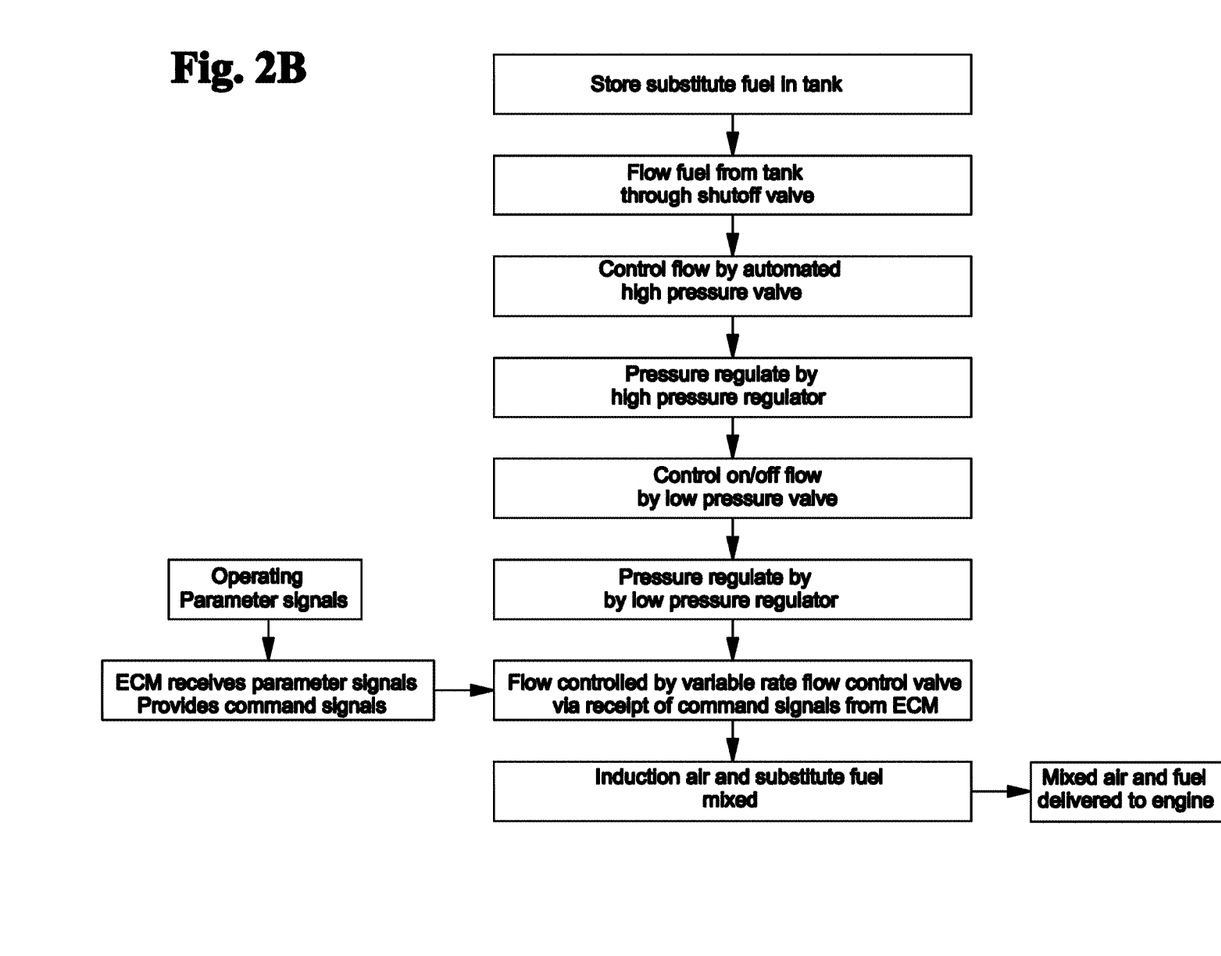
FIG. 2b comprises a flow chart illustrating major components of a dual fuel operation.
Figure 3:
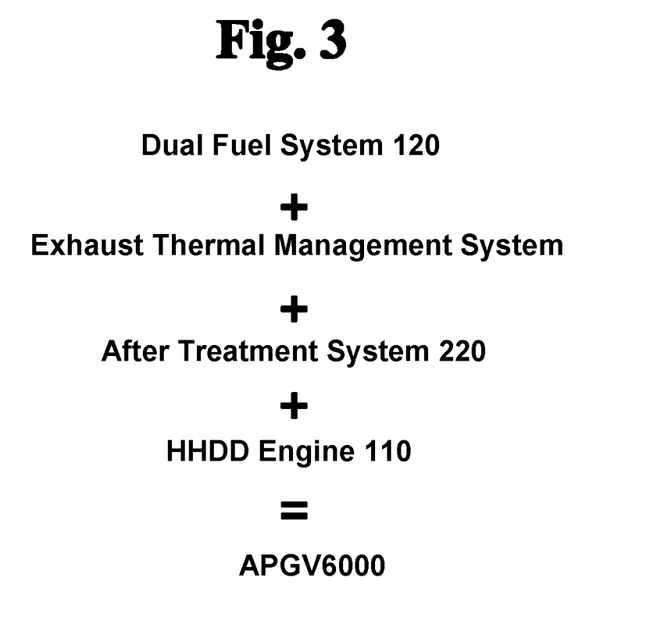
FIG. 3 provides an overview of the relationship of the major components of the APG V6000 emissions management system.
Figure 4:
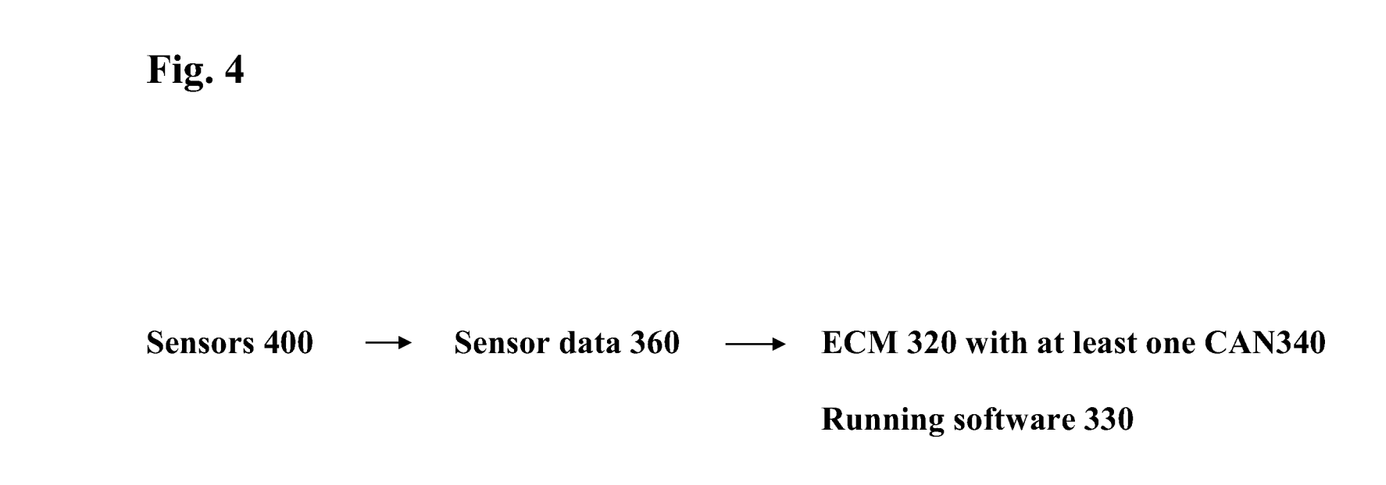
FIG. 4 illustrates the path of sensor data.
Figure 5:
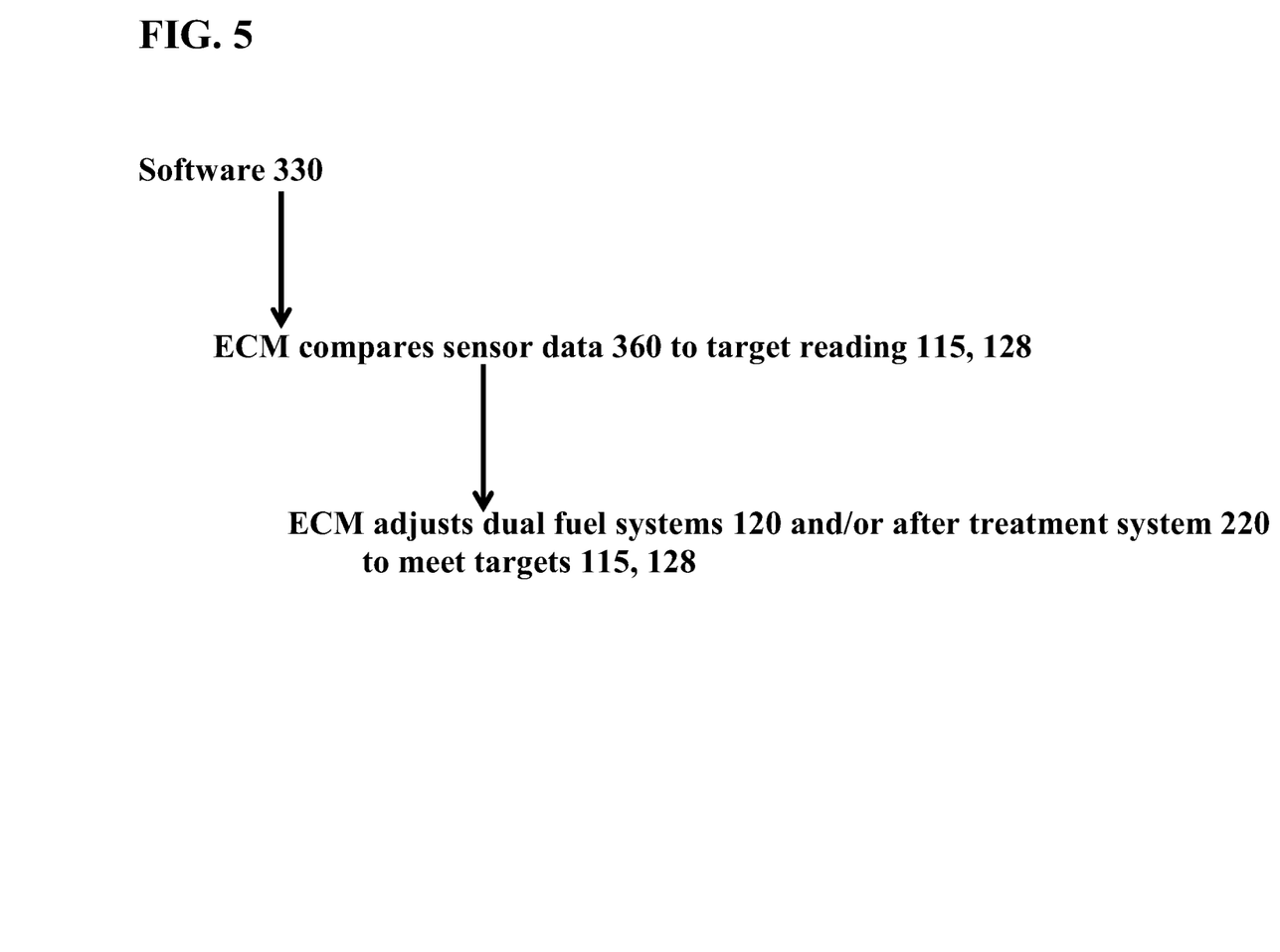
FIG. 5 provides an overview of the work of the ECM.

For pre-2010 HHDD engines the APG V6000 is combined with a pre-2010 Heavy-Heavy Duty Diesel (HHDD) engine 110 and comprises an APG Dual-Fuel system 120 for substituting an amount of natural gas (NG) 25 for diesel fuel 130 (see FIGS. 2, 2a and 2b.). The APG V6000 1 comprises, a "full" after-treatment system 220, and at least one Electronic Control Module(s) (ECM's) 320, with appropriate software 330, utilizing multiple Communication Area Network (CAN) channels to precisely control NG 25 fuel substitution rates 125 and after-treatment operations. The inventors have canvassed current after-treatment technology companies to examine currently available after-treatment systems. It was determined that the current OEM after-treatment systems can and do attain 2010 emission standards but there are no commercially available retro-fit, after-market, after-treatment systems which can fully achieve the 2010 emission standards. Nor were there any after-market up fit systems to provide an exhaust thermal management system to 2010 and newer engines, enabling rapid DOC and SCR activation. Specifically, the inventors have added an exhaust gas thermal control feature 500 which utilizes NG (either by means of an NG fuel line and injector 600 or momentarily enriching the NG flow to the engine via software), pre-DOC and Pre-SCR mounted NG injectors ignitors 502 exhaust temperature sensors 400 and pre 504 (to detect CH4 slip aft of the DOC) and post 506 DOC CH4 sensors. (See FIGS. 2, 2a and 2b). The NG is injected into the exhaust gas stream and ignited, thereby locally raising the temperature of the DOC and/or SCR which, in turn, causes activation of the catalytic reaction and/or the NOX reduction reactions.

The inventors have determined that, for pre-2010 HHDD engines, an up-fit, after-market, after-treatment system 220 provided in an APG V6000 system can reduce the NOx emissions to meet current regulated standards, whereas the addition of an APG Dual Fuel system can further reduce NOx emission, reduce diesel fuel consumption and CO2 emissions. The inventors will provide the "Verified Technology" durability demonstrations that the CARB E.O. certifications and verifications required in order to be offered for commercial sale and meet the Title 13 CCR Section 2025 mandate (the "Mandate") (that pre-2010 HHDD engines 110 be brought into compliance with 2010 exhaust emission standards). The V6000 system adds the exhaust thermal management system (ETMS) to further reduce the NOx emissions. Currently there are no other up-fit after-market Dual Fuel and after-treatment technology combination systems available which meet the CARB E.O. certification and "Verified Technology" requirements, and certainly none available to beat those requirements.

The presented invention can not only attain 2010 exhaust emission standards and significantly reduce diesel fuel 130 consumption, but can also attain much greater NOx emission reduction as well as CO2 reduction. Therefore, the inventors have determined that, in addition to the embodiment for 2010 and newer HHDD engines, they can procure and market after-market systems of the present invention for pre-2010 HHDD engine 110 application.

Pre-Qualification:

In order to achieve the desired results listed above, the subject pre-2010 HHDD engine and 2010 or newer engine 110/vehicle systems need to be pre-qualified as being in appropriate operating condition demonstrated by having:
  a. suitable power (rear wheel power within 75% of rated engine flywheel power as measured on a chassis roll dynamometer)
  b. meeting OEM specified blow-by levels (measured during the power test on a chassis roll dynamometer) and be within OEM recommended specifications.
  c. for 2007 and newer HHDDE applications, the OEM equipped DPF needs to be filtering P.M. emissions appropriately, per OEM specifications Upfit of the APG V6000 system comprising the APG Duel fuel system 120 and the after-treatment system 220 upgrades, the Exhaust Thermal Management System 500 and ECM controller installations 320 as described herein and pertaining to the present invention are not recommended unless the above criteria are met.

The embodiment of the dual-fuel system 120 of the APG V6000 for pre-HHDD engines of the present invention comprises an Electronic Control Module (ECM) 320 controller (or controllers) to monitor engine 115 and dual fuel system parameters 128, along with proprietary software 330, to precisely control NG fuel flow 125 via solenoids 325, and Electronic Throttle Body (ETB) control 350. A Remote Display Unit (RDU) 355, mounted in the vehicle cab or other convenient location provides NG storage and dual fuel operation information 360 to the driver. An NG gas-train 10 delivers and precisely meters NG fuel 25 to the engine 110 through solenoid(s) 325, pressure regulator(s) 326, the digitally controlled Electronic Throttle Body (ETB) 350 and an NG induction system comprising a patent pending venturi designed Induction Gas Mixer (IGM) 370.

The NG substitute fuel 125 is metered to IGM 370 as described above. For an example, please see FIGS. 2, 2a and 2b.

The exhaust gas thermal management system 500 (also present with the 2010 and newer embodiment) is comprised of the Pre-DOC CH4 sensor (504), pre-DOC and/or pre-SCR NG fuel line and NG fuel injector(s)(600), igniter(s) (spark or glo-plug) (502), and post-DOC CH4 sensor 506. Post DOC temperature is measured at the DPF inlet, for instance, by DPF inlet thermocouples (TC) or Resistance Temperature Device (RTD), and communicated to the APG V6000 ECM(s) via CAN bus messaging. Pre-SCR temperatures are also measured via TC or RTD sensors 400 as "real-time" SCR temperature feedback. The exhaust thermal management system 500 uses the on-board natural gas fuel and exhaust stream injector and igniters to affect very rapid DOC and SCR light-off as well as oxidize excess CH4 if detected.

Figure 1:
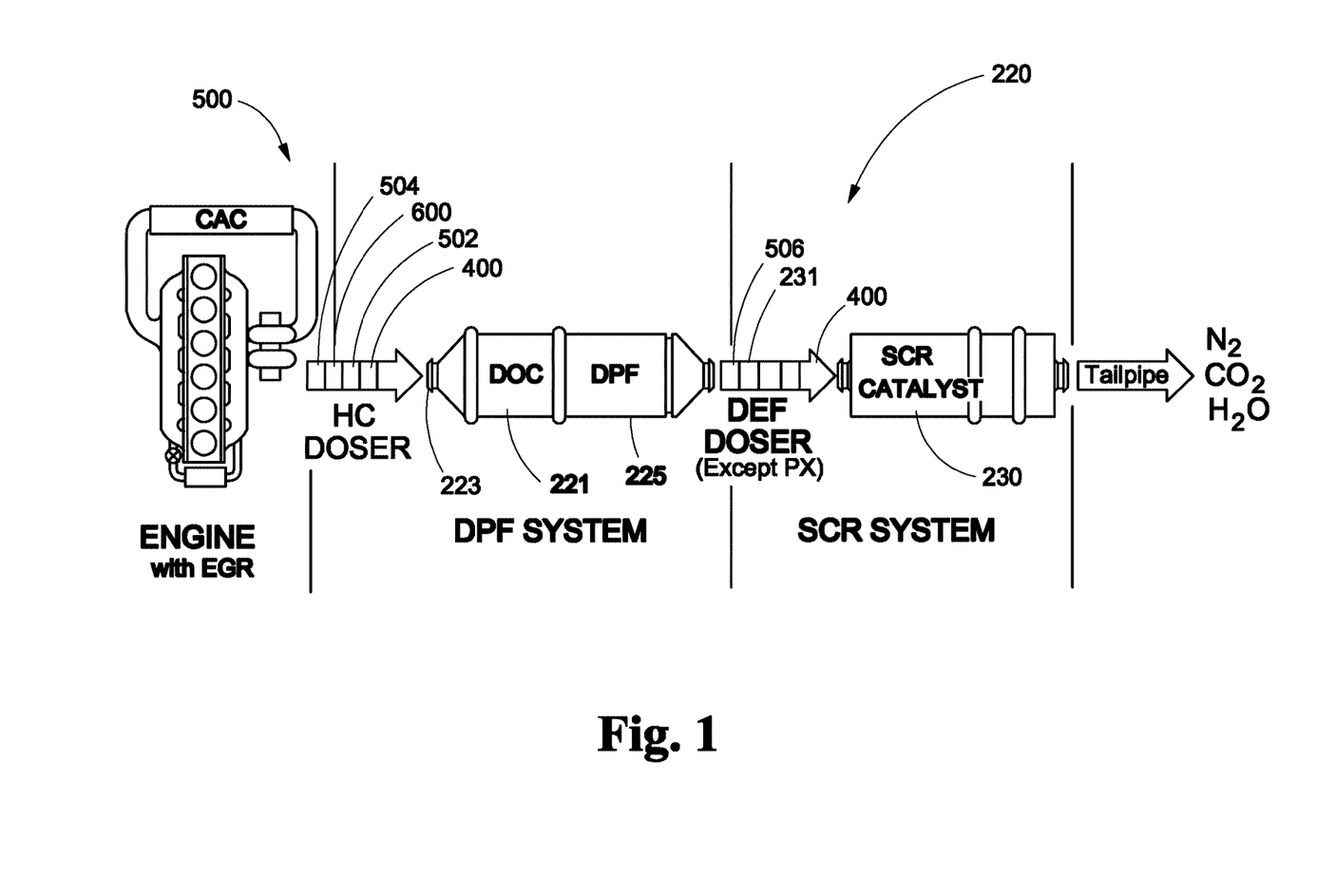
FIG. 1 comprises a drawing of an example emissions management systems (Exhaust After-treatment System and Exhaust Thermal Management System) of the present invention.
Figure 6:
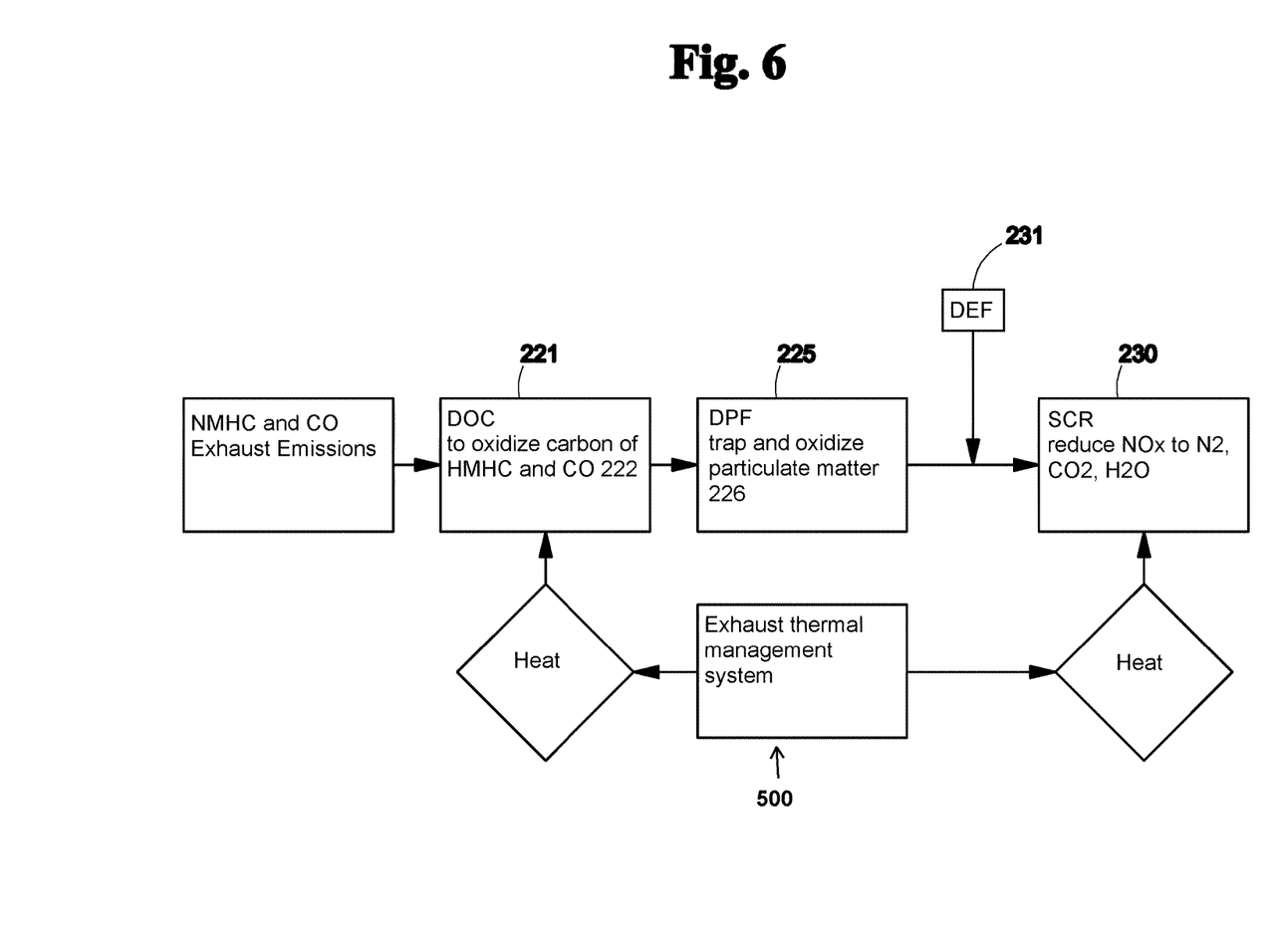
FIG. 6 illustrates the steps for emission treatment.
Figure 7A:
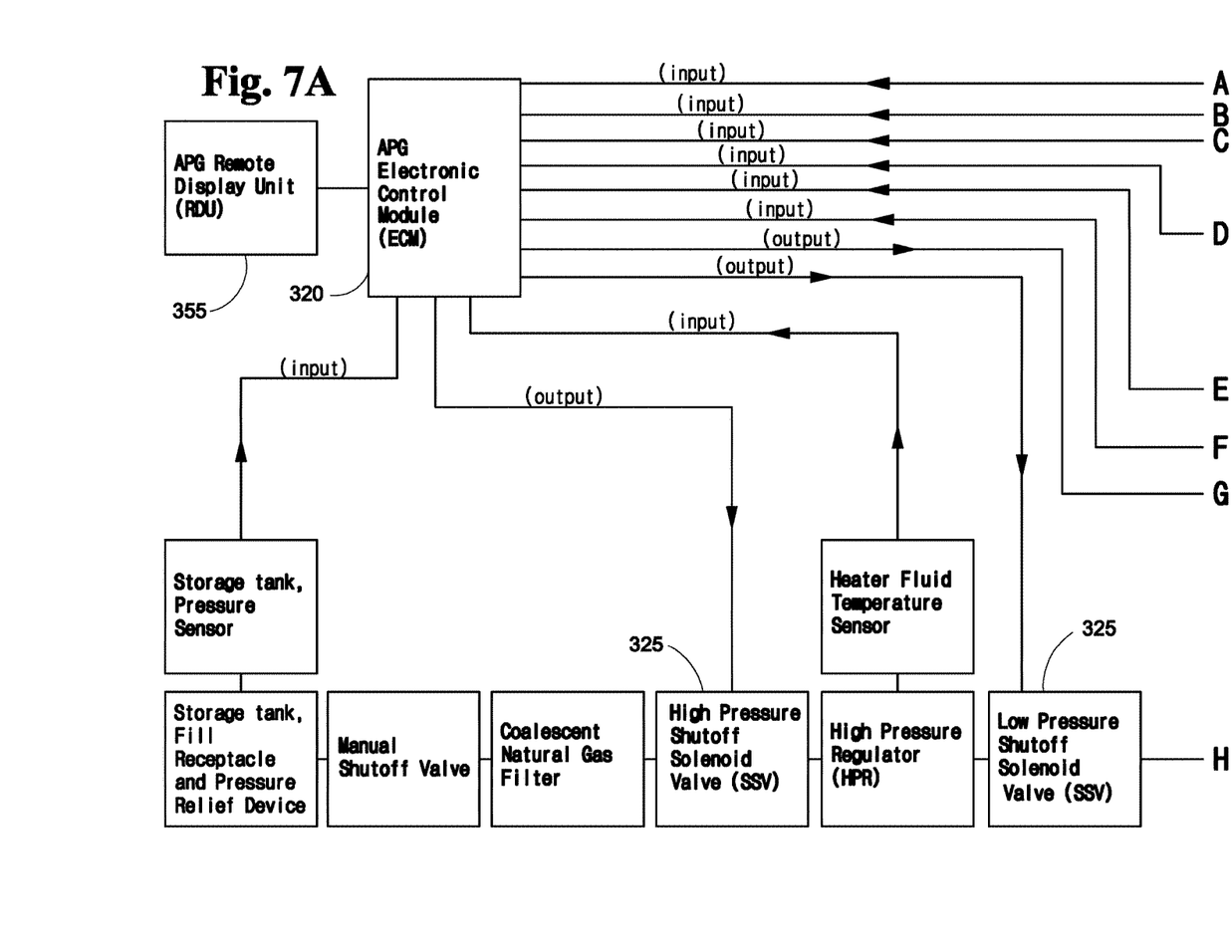
FIGS. 7A and 7B provide an APG Dual Fuel flow diagram showing addition of natural gas in accordance with the invention.
Figure 7B:
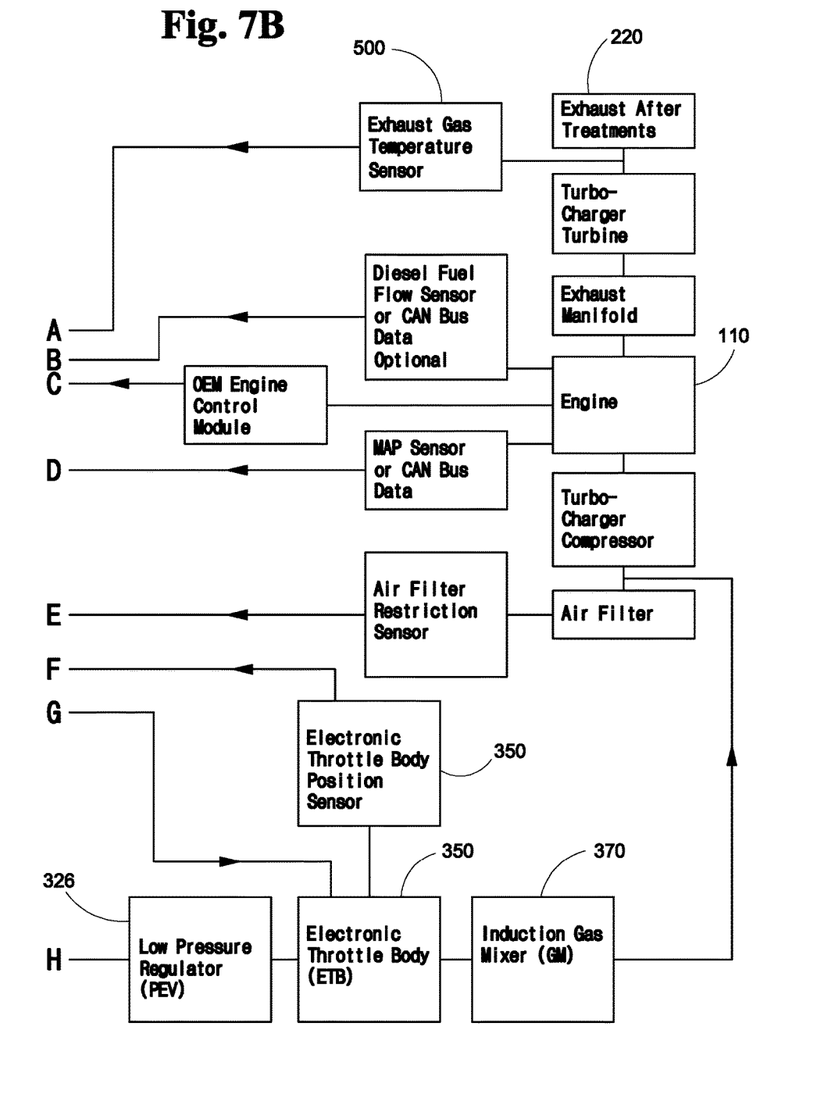

After treatment systems 220 typically comprise a Diesel Oxidation Catalyst (DOC) 221 to oxidize carbon based NMHC and CO exhaust emissions 222, a Diesel Particulate Filter (DPF) 225 to trap particulate emissions 226 (and oxidize them into CO2 during re-generation) and a Selective Catalytic Reduction (SCR) system 230 which employs Diesel Exhaust Fluid (DEF) 231 to reduce the Nitrogen Oxide (NOx) emissions 232. Diesel Exhaust Fluid (DEF) 231 is a non-hazardous solution, of 32.5% urea (CH4N2O) and 67.5% de-ionized water (H2O). DEF 231 is sprayed into an exhaust system of the engine 110, up-stream of the SCR 230 to "reduce" NOx 232 emissions into Nitrogen (N2), Carbon Dioxide (CO2) and water vapor. A key aspect of the after-treatment system is related to achieving and maintaining the temperature necessary to cause the reactions necessary for DEF 231 to reduce the NOx 232. (FIGS. 1 and 6)

The APG Dual-Fuel system 120, Exhaust Thermal Management System (ETMS) (500) and the after-treatment system 220 of the present (APG V6000) are combined as an upfit to pre-2010 HHDD engines and work similarly to those described herein. However, in the inventive application, the APG Dual Fuel system 120, the exhaust thermal management system (500) and the after-treatment system 220 are controlled by Electronic Control Module(s) 320 (ECM's). The ECM(s) 320 will have multiple CAN channels 340. The ECM(s) are sized according to their functional and software requirements, and include multiple channels for controlling the Dual-Fuel system 120, exhaust thermal management system (500), and after-treatment system 220 as well as reading OEM ECM information 360. The controller 320 receives data from multiple sensors 400, 504 and 506 which are placed for detecting critical conditions necessary to manage the objectives for the engine and APG V6000 system. The ECM 320 receives information from the Dual Fuel, after-treatment and ETMS sensors 400, then uses appropriate proprietary software 330 (algorithms) to compare the sensor 400 readings 360 with target readings 360a for engine parameters 115 and/or dual fuel system parameters 128 and causes adjustment to the Dual-Fuel system 120, the Exhaust Thermal Management System (500) and/or the after treatment system 220 in order to achieve or beat the objective targets (e.g. those provided by the CCR, Title 13, Part 2025 Mandate or future mandates, if any) for engine exhaust emission levels 410, as well as target diesel fuel 130 reduction. Sensors 400 may include but are not limited to sensors detecting operating conditions of: induction system pressure/vacuum, gas-train pressure, (for example but not as a limitation SSI Technologies Model # P51-5000-S-A-P-4.5V-5000 PSI), a sensor to sense the NG metering valve electronic throttle body (ETB) 350 position (400b) wherein the ETB may comprise an integral throttle position sensor, e.g. as may be found in Bosch Model 280 750 148, NG 125 flow rates which may be sensed by a flow meter, exhaust gas thermal management system 500 temperatures detected by, for example, a Sensor Nite, TS200-A-83 RTD sensor; may include both pre and post DPF 225 temperature sensors, exhaust gas CH4 levels (pre 504 and post 506 DOC/DPF), exhaust gas pressure readings provided by OEM and after-market DPF systems which include pre and post DPF pressure transducers, pre-DOC 400 and pre-SCR 400 exhaust temperature sensors, for "real-time" measurement, NOx concentration measurements provided by pre and post SCR 230 NOx sensors of the SCR system 230 for "real-time" measurement, diesel fuel 130 flow-rates, exhaust NH3 222 concentration, urea pressure and flow-rates.

The embodiment for 2010 and newer engines comprises at least one ECM (320), the exhaust thermal management system, and sensors to measure temperature and effect rapid DOC and SCR light off as previously described.

Configurations 2010 and "Newer" Engine Applications:

These HHDD engine 110 systems are OEM equipped with OEM DOC 221, DPF 225 and SCR 230 after-treatment systems therefore the V6000 system will have the Exhaust Thermal Management System (ETMS) 500, and the Dual Fuel system 120, as previously described, ECM(s) 320 and software 330 modified as necessary to properly communicate and precisely control the APG Dual Fuel system and ETMS and may or may not include the APG NG Pre-DOC/DPF doser system 222.

2007-2009 Engine Applications:

These HHDD engine 110 systems typically have an OEM exhaust after-treatment systems consisting of a DOC/DPF combination and includes a diesel fuel dosing injector upstream of the DOC inlet, therefore the V6000 system will consist of the APG Dual Fuel system 120 as previously described. It will also include the after-market after-treatment system 220 and comprising an up-fit after-market SCR 230 system along with all sensors 400, controllers 320 and software 330 modified as necessary to properly communicate and precisely control the APG Dual Fuel system, the up-fit SCR after-treatment system and the Exhaust Thermal Management System (ETMS) 500 with its NG injector(s), ignitor(s), exhaust gas temp sensors (RTD's or TC's) and the appropriate ECM, software and CAN networking to communicate with the other V6000 system ECM's and the OEM engine ECM. The V6000 may or may not also comprise the APG NG Pre-DOC/DPF NG igniter doser system 222 but will include the post DPF CH4 sensor, pre-SCR injector, igniter, EGT sensor.

Post-Oct 2002-2006 Engine Applications:

These HHDD engine 110 systems typically have EGR 500, therefore the Dual Fuel/Aftertreatment system may be comprised of the APG Dual Fuel system 120 as previously described, the full after-market after-treatment system 220 which includes the DOC 221, DPF 225, SCR 230 systems and the exhaust thermal management system (500), NG dosers 222, along with all sensors 400, controllers 320 and software 330 to properly communicate and precisely control the APG V6000 emissions management system 1.

Pre-Oct 2002 Engine Applications:

These HHDD engine systems 110 typically do not have EGR (exhaust gas recirculation), therefore the V6000 (Dual Fuel 120/After-treatment 220 system 1 may be comprised of: an after-market EGR 500 system (which would include the EGR plumbing from the exhaust manifold, EGR valve, EGR cooler, induction plumbing and mixer into the intake manifold, EGR control ECM 510, (or the EGR control may be integrated into another related ECM), the Dual Fuel 120 system as previously described, the full after-market after-treatment system 220 which includes the DOC 221, DPF 225, SCR 230 systems and Exhaust Thermal Management System 500; NG fuel DOC 221/DPF 225 doser system; comprised of a 1) NG line, APG ECM controlled NG injector(s) 600 and igniter(s) 502, or 2) APG ECM controlled igniter(s) 502, ECM utilized with Dual Fuel software 330 which momentarily enriches the NG to the engine and ignites the NG rich exhaust mixer at the DOC/DPF inlet 223 (to be utilized on HHDD engine systems which do not have OEM DOC/DPF systems (pre-2007 applications) or replace the existing diesel fuel DOC/DPF doser (2007 and newer)) and CH4 sensors 504, 506 positioned pre and post DOC/DPF, SCR 230 along with all sensors 400, controllers 320 and software 330 (each modified as necessary to adjust for absence of the OEM EGR) to properly communicate and precisely control the APG Dual Fuel system 120, after-treatment system 220 and exhaust thermal management system 500

The invention has been described in detail with particular reference to the preferred embodiments thereof, but it will be understood that variations and modifications can be affected within the spirit and scope of the invention as described hereinafter and as defined in the appended claims.

The invention claimed is:

1. A system for an HHDD engine comprising a dual fuel system, said dual fuel comprising diesel fuel and natural gas, an up-fit after-treatment system, wherein operation of said system for the HHDD engine reduces diesel fuel consumption, exhaust CO2 and NOx emissions as compared to an HHDD engine not equipped with said system, oxidizes NMHC and CO, and filters particulate matter at least to meet CARB Title 13. CCR. Section 2025 mandate 2010 for emission regulatory standard levels (the "Mandate") said system for the HHDD engine further comprising an exhaust thermal management system to facilitate rapid DOC and SCR thermal activation, as compared to an HHDD engine not equipped with said system for the HHDD engine, said exhaust thermal management system further comprising a pre-DOC CH4 sensor, pre-DOC NG injector, pre-DOC igniter, post DOC/DPF CH4 sensor, Pre-SCR NG injector, pre-SCR igniter, pre-SCR temp sensor and at least one ECM controller, said after treatment system comprising a diesel oxidation catalyst, a diesel particulate filter, and a selective catalytic reduction system, said after treatment system injecting an amount of a diesel exhaust fluid comprising a urea compound upstream of the selective catalytic reduction system to reduce at least a portion of said NOx emission to N2 and CO2 and H2O.

2. The system of claim 1, further comprising at least one software program to monitor and precisely control NG substitution rate, a dosing rate for the diesel fuel, a NG injection rate for rapid DOC and SCR light-off, at least one DPF regeneration schedules and a DEF dosing rate for the selective catalytic reduction system.

* * * * *